Patented July 18, 1950

2,515,821

UNITED STATES PATENT OFFICE 2,515,821

MANUFACTURING TETRAETHYL LEAD

Willis Jackson Clem, Wilmington, Del., and Roy Joseph Plunkett, Woodstown, N. J., assignors to E. I. du Pont de Nemours & Company, Wilmington, Del., a corporation of Delaware No Drawing. Application March 29, 1946, Serial No. 658,228

8 Claims. (Cl. 260—437)

This invention relates to a process for manufacturing tetraethyl lead and more particularly to catalyzing the ethylation of lead monosodium alloy with ethyl chloride.

In the usual commercial process for manufacturing tetraethyl lead, ethyl chloride is reacted with lead monosodium alloy in a closed vessel under pressure at about 65° C. to about 85° C. This process ordinarily requires 5 or more hours to complete the reaction. In recent years, it has become important to very greatly increase the production of tetraethyl lead. In order to increase such production materially, it has become important and desirable to greatly decrease the time for carrying the reaction to completion. When it has been attempted to decrease the time of reaction in the old processes, the yield of tetraethyl lead from a given batch of alloy is materially decreased and additional and difficult problems of separating the tetraethyl lead from the reaction mass have been encountered.

An object of the present invention is to provide a process whereby the speed of the reaction is materially increased without a substantial decrease in the yield. Another object is to provide a process whereby the time for completion of the reaction may be greatly decreased with a resulting large increase in the production of tetraethyl lead. A further object is to provide new and improved catalysts for the reaction of ethyl chloride with lead monosodium alloy. Other objects are to advance the art. Still other objects will appear hereinafter.

The above and other objects may be accomplished in accordance with our invention which comprises carrying out the reaction of ethyl chloride on lead monosodium alloy, in the presence of a small proportion, sufficient to accelerate the reaction, of an aldehyde which contains from 0 to 1 benzene rings and consists of carbon, hydrogen, oxygen and 0 to 2 halogen atoms, the oxygen being aldehyde and ethereal oxygen solely. We have found that such aldehydes are extremely effective catalysts for this reaction increasing the speed of the reaction to such an extent that the time required for completion of the reaction is reduced to about one hour. At the same time, high yields of tetraethyl lead are obtained and the difficulty of separating the tetraethyl lead from the reaction mass is not increased. Thereby, the production of tetraethyl lead in a plant is very materially speeded and increased.

We have found that the members of the above defined class of aldehydes are, as a whole, very effective for accelerating the reaction. The aldehyde may be aromatic, alicyclic or acyclic, but, preferably, is aliphatic. The term "aliphatic" as employed herein is employed in the strict sense to mean an open chain and to exclude aromatic and like substituents. The aliphatic aldehydes may be saturated or unsaturated and may contain halogen and ether groups as substituents. The term "aldehyde oxygen" will be understood to mean the oxygen atom which forms the aldehyde group. The term "ethereal oxygen" will be understood to mean the oxygen of an ether group. Preferably, the oxygen in the aldehydes will be aldehyde oxygen solely.

Aldehydes which have been found to be effective to accelerate this reaction are as follows:

$\alpha$-Ethyl-$\beta$-n-propylacrolein
n-Butyraldehyde
i-Butyraldehyde
$\alpha$-n-Amylcinnamaldehyde
2-ethyl butyraldehyde
Tiglaldehyde
Phenylacetaldehyde
Benzaldehyde
i-Propylbenzaldehyde
Hydrocinnamaldehyde
n-Heptaldehyde
Anisaldehyde
Cinnamaldehyde
o-Ethoxybenzaldehyde
Acetaldehyde
Crotonaldehyde
o-Chlorobenzaldehyde
Citronellal
i-Valeraldehyde
Octaldehyde The amount of the aldehyde employed may be varied widely and will depend upon the conditions employed and particularly on the size of the batches and the equipment. Generally, they will be employed in the proportion of from about 0.1% to about 2% based on the ethyl chloride. If proportions of aldehyde substantially above 2% are employed in large scale plant operations carried out in an autoclave, they become less effective and may even be detrimental to the yields. Generally, in small scale production in a bomb, larger proportions of the aldehydes will be effective and may even be desirable. In small scale experiments, some of the aldehydes have been found to be most effective in proportions of about 1%, based on the ethyl chloride. However, in substantially all plant operations, the optimum results will be obtained with less than 1% of the aldehyde.

While the aldehyde may be added to the reactants or to the reaction vessel in any desired manner and at any desired stage of the process, it will generally be most desirable to add the aldehyde to the ethyl chloride prior to mixing the ethyl chloride with the alloy. The process of making tetraethyl lead will remain unchanged, except for the addition of the aldehyde and the shorter time required for the completion of the process.

In order to more clearly illustrate our invention, preferred modes of carrying the same into effect and the advantageous results to be obtained thereby, the following examples are given:

EXAMPLE I

Approximate 100 g. of lead-sodium alloy (containing 10.0% sodium) of a size which passed a 4 mesh screen and was retained on a 10 mesh screen, was charged into each of six steel bombs having a capacity of 150 ml. Fifty milliliters of ethyl chloride was added to each bomb and 0.27 cc. of acetaldehyde was added to each of three of them. The bombs were closed and tumbled in a water-bath maintained at 85° C. for 90 minutes. After the heating period, the hot water was drained and the bath was refilled with cold water. After 15 minutes, the bombs were removed and placed on ice.

Each reaction mass was extracted with 2000 ml. of benzene. A 50 ml. aliquot of the benzene solution was titrated with iodine solution to determine the yield of tetraethyl lead. The yields, in the three bombs containing acetaldehyde, were 78.93%, 83.67% and 82.58% while the yields in the other three were 77.36%, 77.82% and 79.24%.

In another series of tests employing 50 g. of lead monsodium alloy and 100 g. of ethyl chloride and various aldehydes in different concentrations, a heating time of only five minutes was used in order to show more clearly the accelerating effect. The results are given in the following Table I in yield % of tetraethyl lead:

*Table I*

| Accelerator | 0.1% | 0.2% | 0.5% | 1.0% |
| --- | --- | --- | --- | --- |
| None (control) | | 14.51 | | |
| i-Butyraldehyde | 31.90 | 35.94 | 43.01 | 55.84 |
| n-Butyraldehyde | | 47.41 | 57.17 | 60.25 |
| α-Ethyl-β-n-propylacrolein | 18.94 | 28.56 | 50.70 | 59.27 |
| α-n-Amylcinnamaldehyde | 28.91 | 30.51 | 42.77 | 53.80 |
| Benzaldehyde | 18.40 | 20.82 | 45.18 | 51.08 |
| Phenylacetaldehyde | 26.60 | 32.86 | 45.19 | 50.50 |

It will be understood that our invention is not to be limited to the specific embodiments disclosed, but that our invention may be modified in various respects without departing from the spirit or scope thereof. For example, other aldehydes within the class hereinbefore defined may be substituted for those specifically disclosed herein.

We claim:

1. In the process of making tetraethyl lead by the reaction of ethyl chloride on lead monosodium alloy, the improvement which comprises carrying out the reaction in the presence of a small proportion, sufficient to accelerate the reaction, of an aliphatic aldehyde which consists of carbon, hydrogen and oxygen, the oxygen being aldehyde and acyclic ethereal oxygen solely.

2. In the process of making tetraethyl lead by the reaction of ethyl chloride on lead monosodium alloy, the improvement which comprises carrying out the reaction in the presence of a small proportion, sufficient to accelerate the reaction, of an aliphatic aldehyde which, except for the oxygen of the aldehyde group, consists of carbon and hydrogen.

3. In the process of making tetraethyl lead by the reaction of ethyl chloride on lead monosodium alloy, the improvement which comprises carrying out the reaction in the presence of a small proportion, sufficient to accelerate the reaction, of acetaldehyde.

4. In the process of making tetraethyl lead by the reaction of ethyl chloride on lead monosodium alloy, the improvement which comprises carrying out the reaction in the presence of a small proportion, sufficient to accelerate the reaction, of an aldehyde which contains a single benzene ring and consists of carbon, hydrogen and aldehyde oxygen solely.

5. In the process of making tetraethyl lead by the reaction of ethyl chloride on lead monosodium alloy, the improvement which comprises carrying out the reaction in the presence of a small proportion, sufficient to accelerate the reaction, of butyraldehyde having the empirical formula $C_3H_7CHO$.

6. In the process of making tetraethyl lead by the reaction of ethyl chloride on lead monosodium alloy, the improvement which comprises carrying out the reaction in the presence of a small proportion, sufficient to accelerate the reaction, of n-butyraldehyde.

7. In the process of making tetraethyl lead by the reaction of ethyl chloride on lead monosodium alloy, the improvement which comprises carrying out the reaction in the presence of a small proportion, sufficient to accelerate the reaction, of benzaldehyde.

8. In the process of making tetraethyl lead by the reaction of ethyl chloride on lead monosodium alloy, the improvement which comprises carrying out the reaction in the presence of a small proportion, sufficient to accelerate the reaction, of an aldehyde of the class consisting of aliphatic aldehydes which consist of carbon, hydrogen and oxygen, the oxygen being aldehyde and acylic ethereal oxygen solely, aromatic aldehydes which contain a single benzene ring and consist of carbon, hydrogen and aldehyde oxygen solely and corresponding chlorinated aldehydes containing from 1 to 2 chlorine atoms solely.

WILLIS JACKSON CLEM.
ROY JOSEPH PLUNKETT.

REFERENCES CITED

The following references are of record in the file of this patent:

UNITED STATES PATENTS

| Number | Name | Date |
| --- | --- | --- |
| 1,622,228 | Midgley | Mar. 22, 1927 |
| 1,645,389 | Monroe | Oct. 11, 1927 |
| 1,717,961 | Daudt et al. | June 18, 1929 |
| 1,749,567 | Daudt | Mar. 4, 1930 |

FOREIGN PATENTS

| Number | Country | Date |
| --- | --- | --- |
| 216,083 | Great Britain | Feb. 16, 1925 |